(12) United States Patent
Johnson

(10) Patent No.: US 8,201,826 B1
(45) Date of Patent: Jun. 19, 2012

(54) GAME WITH STYLUS HAVING DIFFERENTLY SHAPED ENDS AND HOUSING HAVING CORRESPONDING HOLES

(76) Inventor: Haywood E. Johnson, Stedman, NC (US)

( * ) Notice: Subject to any disclaimer, the term of this patent is extended or adjusted under 35 U.S.C. 154(b) by 366 days.

(21) Appl. No.: 12/705,116

(22) Filed: Feb. 12, 2010

(51) Int. Cl.
*A63H 3/00* (2006.01)

(52) U.S. Cl. ........ 273/237; 273/440; 273/445; 273/454; 463/7

(58) Field of Classification Search .......... 273/459–461, 273/440, 445, 454, 236–237, 429, 432, 273; 463/7, 9; 446/85, 106
See application file for complete search history.

(56) References Cited

U.S. PATENT DOCUMENTS

| | | | |
|---|---|---|---|
| 2,808,263 A * | 10/1957 | Goldfinger et al. ........... 273/455 |
| 3,538,622 A | 11/1970 | Zadig |
| 3,710,455 A * | 1/1973 | Liversidge et al. ........... 434/259 |
| 3,760,511 A | 9/1973 | Matsumoto |
| 3,771,793 A * | 11/1973 | Kraemer ....................... 273/139 |
| 3,943,629 A * | 3/1976 | Ueno et al. .................... 434/263 |
| 4,039,184 A * | 8/1977 | Breslow et al. ............... 273/448 |
| 4,041,615 A | 8/1977 | Whitehill |
| 4,103,895 A * | 8/1978 | Pressman et al. ............. 463/15 |
| 4,121,354 A | 10/1978 | Sbarra et al. |
| 4,169,592 A * | 10/1979 | Hall ................................. 463/7 |
| 4,238,904 A | 12/1980 | Lang |
| 4,288,537 A * | 9/1981 | Knetzger ....................... 434/169 |
| 4,339,135 A * | 7/1982 | Breslow et al. ................. 463/7 |
| 4,340,223 A * | 7/1982 | Kuna et al. .................... 273/445 |
| 4,385,762 A * | 5/1983 | Schwartz ....................... 273/454 |
| 4,557,694 A * | 12/1985 | Nelson ........................... 434/339 |
| 4,561,851 A | 12/1985 | Fierreira et al. |
| 4,604,065 A | 8/1986 | Frazer et al. |
| 4,609,356 A | 9/1986 | Gilden et al. |
| 4,627,620 A * | 12/1986 | Yang .............................. 273/446 |
| 4,770,416 A * | 9/1988 | Shimizu et al. .................. 463/9 |
| 4,919,418 A | 4/1990 | Miller |
| 4,986,540 A | 1/1991 | Leslie |
| 5,009,419 A * | 4/1991 | Streeter ......................... 273/454 |
| 5,039,094 A * | 8/1991 | Kobayashi et al. ........... 273/446 |
| 5,221,243 A * | 6/1993 | Walker ............................ 482/83 |
| 5,271,627 A * | 12/1993 | Russell et al. ................. 273/445 |
| 5,604,517 A * | 2/1997 | Filo .............................. 345/173 |
| 5,855,373 A * | 1/1999 | Chen ............................. 273/441 |
| 5,882,011 A * | 3/1999 | Praria ........................... 273/445 |
| 5,887,874 A * | 3/1999 | Goldfarb et al. .............. 273/455 |
| 6,056,622 A | 5/2000 | Chung |
| 6,068,262 A * | 5/2000 | Goldfarb et al. .............. 273/457 |

* cited by examiner

Primary Examiner — Dmitry Suhol
Assistant Examiner — Alex F. R. P. Rada, II
(74) Attorney, Agent, or Firm — Coats & Bennett, P.L.L.C.

(57) ABSTRACT

A game that includes a stylus with differently shaped ends and a housing having stylus-receiving holes therein that are in at least two sets corresponding to the shapes of the stylus ends. Variable visual indicators and sensors are associated with each hole, with the sensors operative to detect the presence of the stylus in the corresponding hole. A controller causes the visual indicators to be sequentially activated. The controller causes a different indictor to be activated in response the stylus being present in the targeted hole. Thus, the stylus-receiving holes are progressed through in a targeting sequence. The controller is configured to terminate an active game session in response to the earlier occurring of: expiration of the timer and detection of the insertion of the stylus into an untargeted hole. Various game modes are described, including with a vibration sensor and a moving housing.

11 Claims, 4 Drawing Sheets

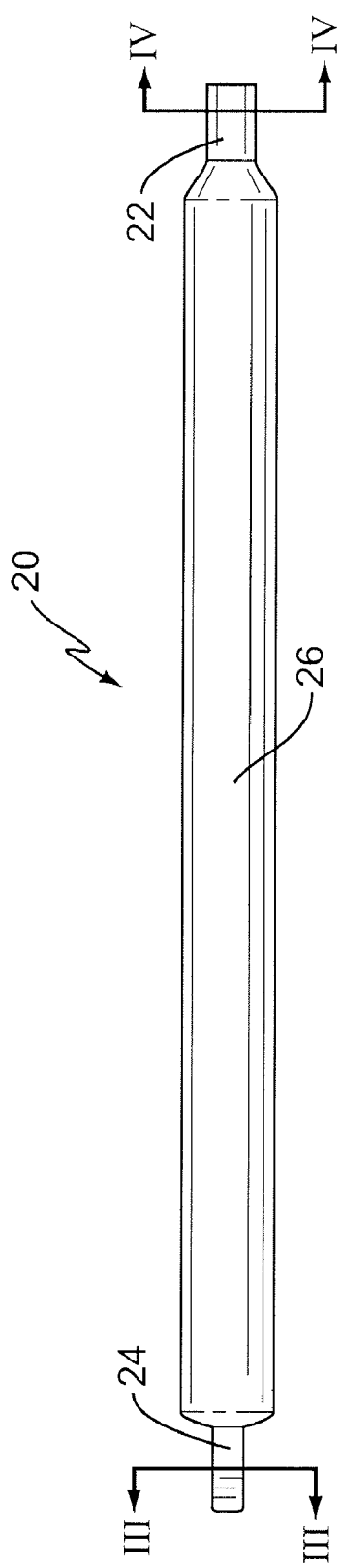
FIG. 2
FIG. 4
FIG. 3

GAME WITH STYLUS HAVING DIFFERENTLY SHAPED ENDS AND HOUSING HAVING CORRESPONDING HOLES

BACKGROUND

The present invention relates to a game of amusement that employs a housing with suitable electronics and a stylus with differently shaped ends.

Numerous games exist, many of which employ electronics for various reasons such as timekeeping, scoring, and the like. Further, many games employ a hand-held stylus or pointer, which is sometimes used to interact with a housing. And, a few games require substantial dexterity to successfully conclude the game. However, few games combine these attributes in a fun and amusing way. As such, there remains a need for alternative games, particularly games that require substantial manual dexterity.

SUMMARY

The present invention is a game that includes a stylus with differently shaped ends and a housing having stylus-receiving holes therein that are in at least two sets corresponding to the shapes of the stylus ends. In one embodiment, the game comprises a housing having electronics associated therewith, and a stylus having first and second ends, with the first and second ends having different cross-sectional shapes. The housing has a first plurality of holes of a first shape and a second plurality of holes of a second shape, with the first shape corresponding to the shape of the stylus first end and the second shape corresponding to the shape of the stylus second end. The electronics comprise a plurality of variable visual indicators each associated with a corresponding one of the holes, with each of the visual indicators having an activated state where the indicator is relatively more visible and an deactivated state where the indicator is relatively less visible. A plurality of sensors are each associated with a corresponding one of the holes, with the sensors operative to detect the presence of the stylus in the corresponding hole. A controller circuit communicates with the lights and the sensors. The controller circuit causes not more than one of the plurality visual indicators to be activated at any given time during an active game session to indicate a target hole. The controller circuit is operative to cause a different indictor to be activated in response to detection, by the associated sensor, of the presence of the stylus in the target hole. Thus, the stylus-receiving holes are progressed through in a targeting sequence. The controller circuit is configured to terminate an active game session after initiation thereof in response to detection, by the associated sensor, of the insertion of the stylus into any non-targeted hole.

The controller may have a plurality of game modes. In a first game mode, the controller may be operative to cause the visual indicators to be activated in a predetermined adjacent sequence. In a second game mode, the controller may be operative to cause the indicators to be activated in a random sequence. In a third game mode, a vibration sensor may be employed, and the controller may be operative to also terminate the game session in response to detection, by the vibration sensor, of vibration of the housing. In a fourth game mode, a displacement mechanism may be employed that is capable of shaking the housing, and the controller may be operative to activate the displacement mechanism to cause the housing to intermittently move in an unpredictable fashion.

The various aspects and modes disclosed herein may be used alone or in any combination, as is desired.

BRIEF DESCRIPTION OF THE DRAWINGS

FIG. 2 shows a more detailed view of the stylus of FIG. 1.
FIG. 3 shows a cross-section of one end of the stylus of FIG. 2.
FIG. 4 shows a cross-section of another end of the stylus of FIG. 2.

DETAILED DESCRIPTION

Figure 1:
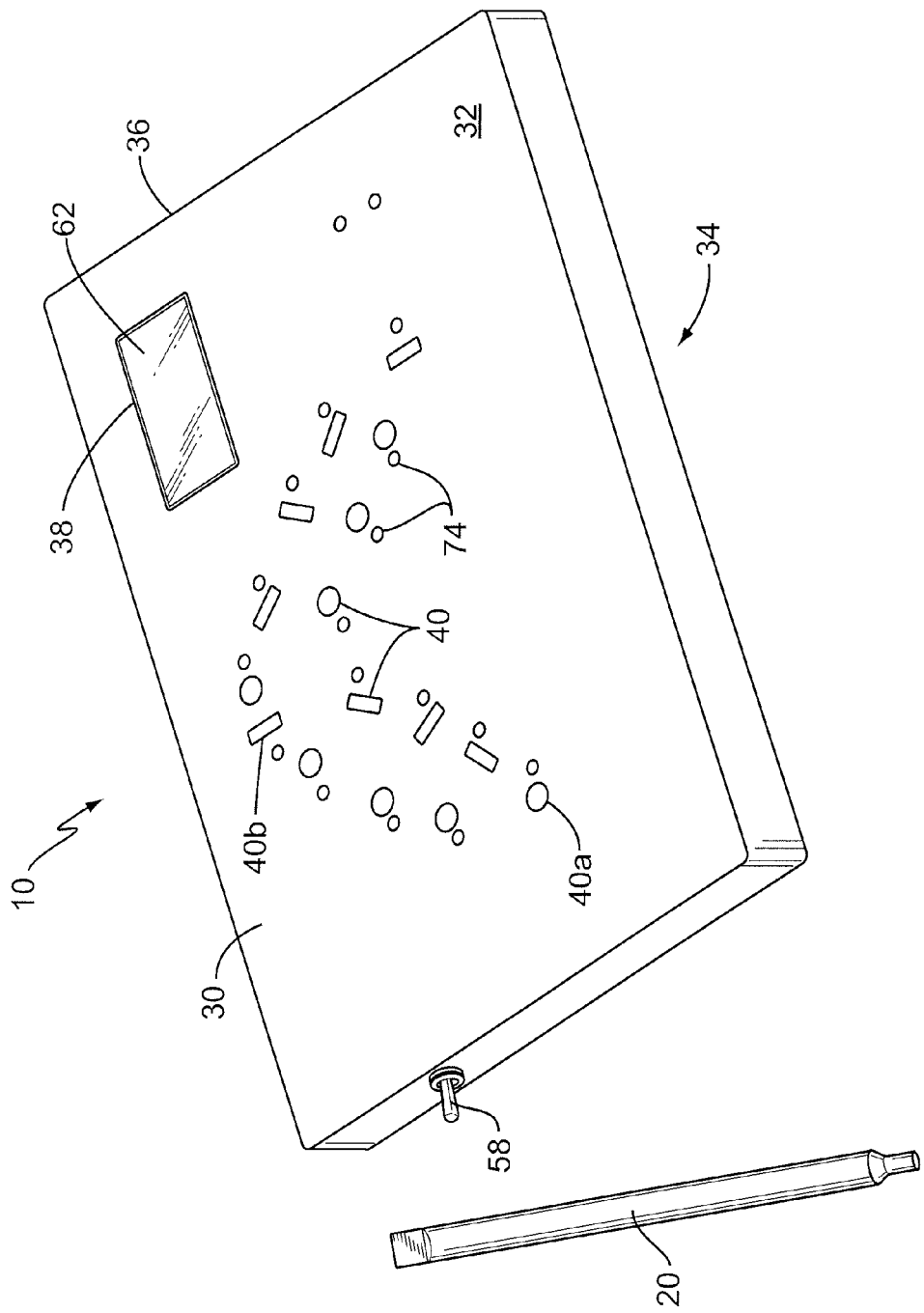
FIG. 1 shows a game according to one embodiment of the invention.

The present invention is directed to a game, with an exemplary embodiment shown in FIG. 1 and generally designated 10. The game 10 of FIG. 1 includes a stylus and a housing having electronics therein.

The stylus 20 shown in FIGS. 1-4 is a straight rod having first and second ends 22, 26 and an intervening midsection 24. The first end 22 has a protrusion that has a first cross-sectional shape and the second end has a protrusion that has a second cross-sectional shape. For the exemplary stylus 20, the first cross-sectional shape is round while the second cross-sectional shape is rectangular. However, it should be understood the cross-sectional shapes are not limited to round and rectangular, and any shape may be used, such as oval, square, star, multi-lobed, triangular, half-round, etc. Advantageously, the shapes of the ends 22,26 are selected to be mutually-exclusive. The midsection 24 should be of sufficient length to be readily gripped, and may include suitable grip enhancements, such as knurling or the like. By way of example, the stylus 20 may advantageously be about six inches long and about the size of a conventional wooden pencil. The stylus 20 should be rigid, and may therefore be made from any suitable rigid material such as metal (e.g., aluminum), rigid polymers, ceramics, or the like. Optionally, the stylus may be magnetized.

Figure 5:
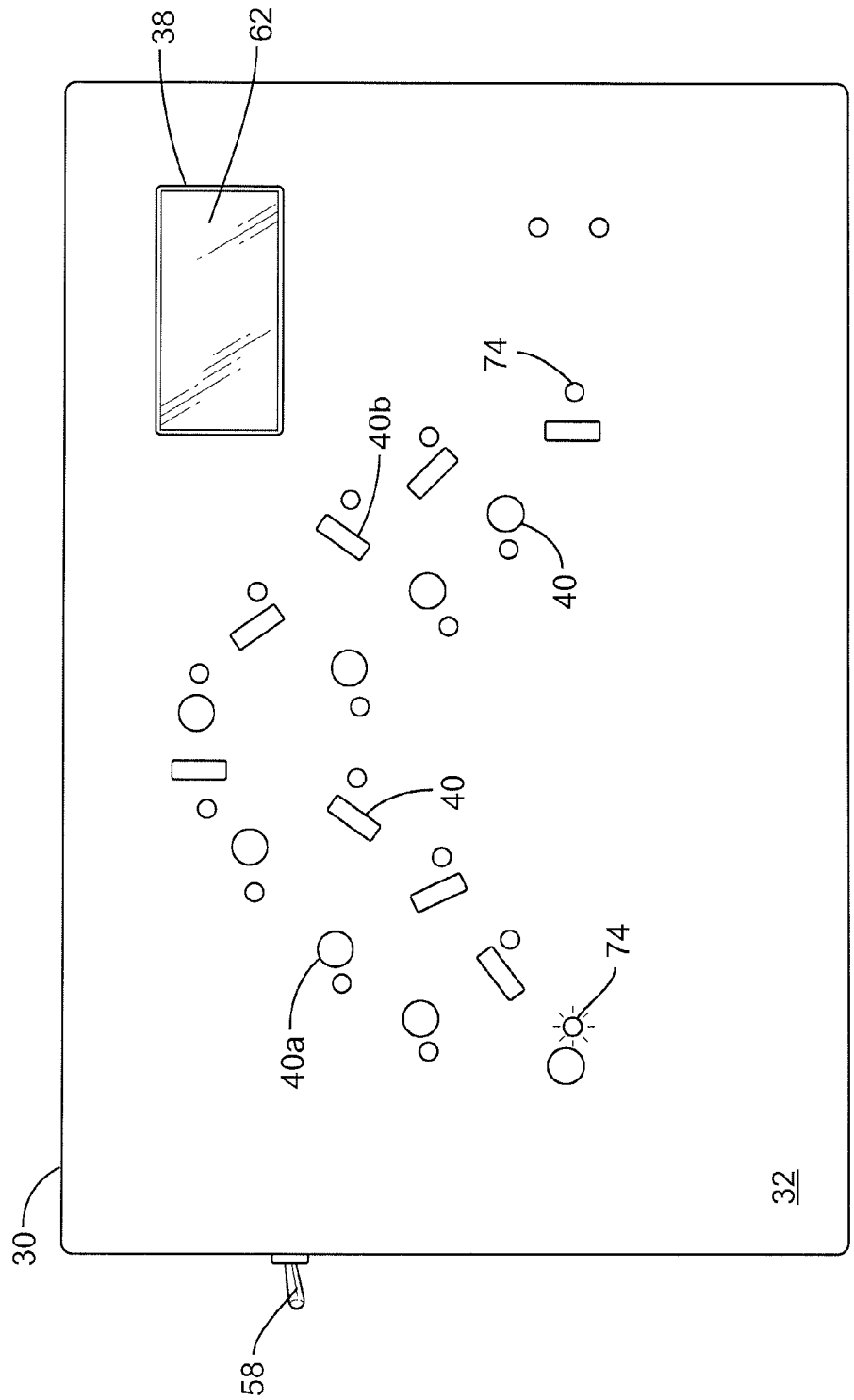
FIG. 5 shows top view of the housing of FIG. 1 with the leftmost hole targeted.

The housing 30 shown in FIGS. 1,5 is generally rectangular, with a top 32, bottom 34, and perimeter sidewalls 36. The top 32 includes an opening 38 for a display 62 and a plurality of stylus-receiving holes 40. The holes 40 are in two sets, a first set 40a having a first shape (e.g., round) and a second set 40b having a second shape (e.g., rectangular). For non-symmetric holes 40, the holes 40 may be at a variety of orientations, if desired. The sets of holes 40a,40b are advantageously intermixed. The holes 40 may be arranged in any pattern, such as in the sweeping arch configuration shown in the figures. The housing 40 may also have a recess or other means (not shown) for retaining the stylus 20.

Figure 6:
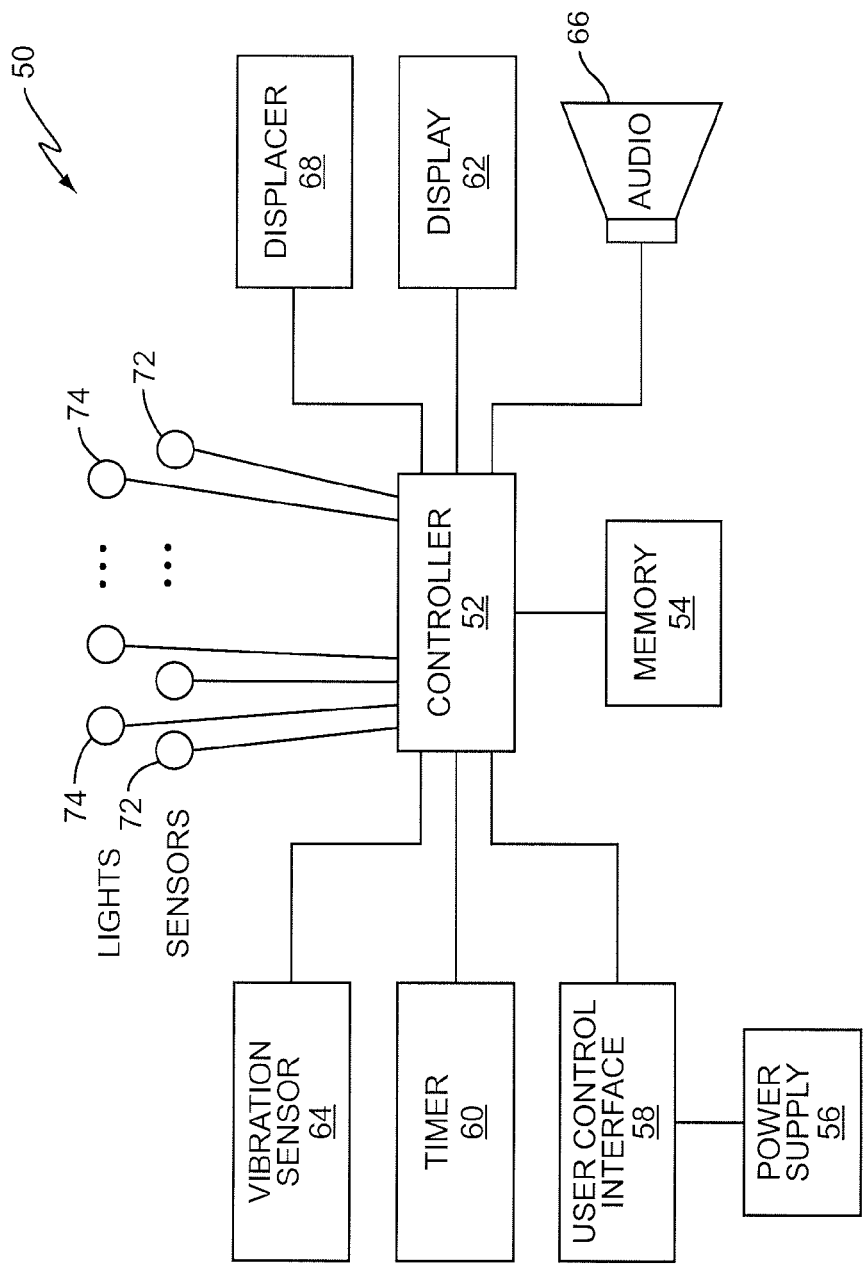
FIG. 6 shows a block diagram of the electronics of the device of FIG. 1.

The electronics 50 are housed in the housing 30. The electronics 50, in one embodiment shown in FIG. 6, include a control circuit (or simply "controller") 52, memory 54, a power source 56, a user control interface 58, a timer circuit 60, a display 62, vibration sensor 64, an audio output device 66, a displacement mechanism 68, a plurality of hole sensors 72, and a plurality of lights 74. The controller 52 controls the overall operation of the game and may take the form of suitable dedicated discrete circuitry, a microprocessor, an ASIC, or the like. The memory 54 communicates with the controller 52 and provides a location for storing control program(s), shortest times, scores, and the like, and may take any form known in the art, including internal to the controller 52. The power source 56 supplies power to the rest of the electronics 50, and typically takes the form of one or more batteries with suitable power conditioning circuitry as desired. The user control interface 58 may be simple or more complex as is desired. In a simple form the user control interface 58 may be a simple on/off switch. In a more complex form, the user control interface 58 may also include scroll and other input buttons for selecting an operating mode of the device, resetting the device, entering data such as names, and the like. The user control interface 58 may work in conjunction with display 62. Display 62 is in communication with controller 52 and advantageously takes the form of an LCD display that displays, among other items, the elapsed time as measured by timer circuit 60. Vibration sensor 64 communicates with the controller 52 and may take any form known in the art, such as an accelerometer or tilt sensor. The purpose of the vibration sensor 64 is to monitor the amount of vibration that the housing 30 is subjected to during the play of the game in some modes. The audio output device 66 may take any desired form, such as a simple buzzer, piezoelectric speaker, or the like. The audio output device 66 operates under the control of the controller 52, and may be used to signal a successful completion of the game, an error, or may even be used to generate entertaining or distracting noises, as is desired. The shaker or displacement mechanism 68 operates under the control of controller 52. The displacement mechanism 68 may take the form of one or more eccentric weights selectively rotating relative to a base that is suspended from a plurality of variable stiffness elastic elements disposed at asymmetric angles. The controller 52, or electronics dedicated to the displacement mechanism 68, could control the rate of rotation of the eccentric weights and the stiffness of the elastic elements to cause a weight shift within housing 30 that causes the housing to be displaced. The displacement mechanism 68 is operative to cause the housing 30 to move unpredictably relative to the underlying surface (e.g., table top) that the housing 30 is resting on. Advantageously, the displacement mechanism 68 is operated in an intermittent way such that the housing 30 is caused to intermittently jerk in a random direction for some modes of operation, as discussed below.

The hole sensors 72 communicate with the controller 52 and are operative to detect when the stylus 20 is inserted into the corresponding hole 40. There should be a hole sensor 72 for each hole 40. The hole sensors 72 may take the form of a reed switch (for a magnetic stylus 20 or a stylus 20 that has magnets on its ends), or advantageously a pressure switch that is tripped when the stylus 20 presses sufficiently thereagainst.

The lights 74 operate under control of the controller 52, and may take the form of LEDs. There should be a light 74 for each hole 40. The light 74 may be located at any desired angular relative position to the hole 40, but should be located close enough to the corresponding hole 40 so that it is visually unambiguous as to which hole 40 the light 74 "belongs." The lights 74, as is conventional, have a lit or activated state wherein the light 74 is more visible and an unlit or deactivated state where the light 74 is less visible.

The device 10 may, in some embodiments, have four operating modes. In a first mode, the controller 52 may cause the lights 74 to be illuminated in a pre-determined sequence that is advantageously an adjacent sequence. As used herein, an adjacent sequence is a sequence where the items are arranged so that each intermediate item in the sequence is physically adjacent to both the previous and next item in the sequence. Thus, the targeting sequence of this mode may appear to sweep generally left-to-right across the holes 40. When a light associated with a hole 40 is on, that hole 40 is the "target" hole. The game is played by the user inserting the correct end 22,26 of the stylus 20 in the target hole 40. Due to the shapes of a given hole and the stylus ends 22,26, only one end of the stylus 20 should be able to be inserted in a given hole 40. When the hole sensor 72 of the target hole 40 detects the removal of the stylus 20 from the targeted hole, the controller 52 causes the next hole 40 in the sequence to become the target hole 40. The user proceeds through the holes 40 as they are targeted until all holes 40 have been completed. If desired, the holes 40 may be progressed through one time or multiple times before a round is considered complete. It should be noted that as the sequence progresses, the user will be required to use different ends 22,26 of the stylus 20 because the holes 40 in the sequence will belong to different sets 40a,40b and therefore have different shapes. Depending on the layout, the player may be required to switch stylus ends 22,26 (e.g., flip the stylus 20 upside down) for each successive hole 40, or there may be two or more holes 40 of one shape followed by one or more holes 40 of the other shape. Upon the last hole 40 being completed, the round is complete and the controller 52 causes a winning sound to be generated by audio output device 66 and the elapsed time to be displayed by display 62. The game may then end, may continue in the same mode such as for another player, or may continue in another mode. The round may be ended successfully or unsuccessfully. An unsuccessful end occurs when the elapsed time exceeds a limit, or when the stylus 20 is inserted in an untargeted hole 40 (and the associated hole sensor 72 notifies the controller 52).

A second mode is similar to the first mode, but the targeting sequence of holes 40 appears to be random rather than a simple progression. Thus, the next hole 40 targeted may be any of the other holes 40 not already targeted. The random sequence may be truly random, or may be a predetermined sequence that appears to jump around through the available holes 40; both types are considered "random" herein.

A third mode adds a vibration aspect. In the third mode, the controller 52 also causes the round to be terminated unsuccessfully if the vibration sensor 64 determines that the housing 30 has been vibrated too much. Thus, a player must not only place the stylus 20 in the correct hole 40, but must do so without unduly shaking the housing 30. For the third mode, the holes 40 may be targeted in any sequence describe above.

A fourth mode adds a moving housing aspect. In the fourth mode, the controller 52 causes the displacement mechanism 68 to intermittently activate so as to cause the housing 30 to move in a jerking fashion, advantageously in random directions. Thus, a player must not only place the stylus 20 in the correct hole 40, but must do so while in effect chasing the moving housing 30. For the fourth mode, the holes 40 may be targeted in any sequence describe above.

The device 10 may operate according to any one of the modes described above, or may operate according to any combination of the modes described above. Advantageously, the device 10 progresses through the modes in increasing difficulty as the prior mode is successfully completed. The time displayed may be the time for a given level/mode/round or may be the cumulative time, as desired.

In the discussion above, lights 74 such as LEDs have been used to indicate the target hole 40. However, the present invention is not limited to lights 74, and any form of variable visual indicator 74 may be used. For example, each hole 40 may have an LCD display associated therewith, or a single LCD display may span several holes 40, and the target indication may be provided by an arrow or other LCD indicia proximate the target hole 40. The presence of the LCD indicia is considered to be an activated indicator and the absence or diminishing of the LCD indicia is considered to be a deactivated indicator.

The discussion above has been in the context of the stylus 20 having two differently shaped ends 22,26. Such is appropriate for elongate double-ended styluses. However, the stylus 20 may, in some embodiments, be of a branched type with more than two ends, each with a protrusion of a different cross-sectional shape. For example, the stylus 20 may be T-shaped or X-shaped. The holes 40 could then be of more than two shapes, corresponding to the shapes of the stylus ends.

While the displacement mechanism 68 has been described above in the context of using selectively movable eccentric weights, such is not required in all embodiments. Indeed, an alternative approach is to have ball bearings or the like on the bottom 34 of housing 30 for support, and include two or more contact wheels disposed at differing angles that extend downward from the housing 30. The contact wheels are coupled to variable speed bi-directional motors. The controller 52 controls the on/off state, speed, and direction of the motors, which in turn controls the movement of the contact wheels. Selective movement of the wheels then causes the housing 30 to be displaced in the desired random, jerking fashion. Another approach would be to use one or more contact balls rather than contact wheels, with the balls drivable in desired variable directions and speeds.

The present invention may, of course, be carried out in other specific ways than those herein set forth without departing from the scope of the invention. The present embodiments are, therefore, to be considered in all respects as illustrative and not restrictive, and all changes coming within the meaning and equivalency range of the appended claims are intended to be embraced therein.

The invention claimed is:

1. A game, comprising:
   a housing having electronics associated therewith;
   a stylus having first and second ends; the first and second ends having different cross-sectional shapes;
   the housing having a first plurality of holes of a first shape and a second plurality of holes of a second shape; the first shape corresponding to the shape of the stylus first end; the second shape corresponding to the shape of the stylus second end;
   the electronics comprising:
      a plurality of variable visual indicators each associated with a corresponding one of the holes; each of the visual indicators having an activated state where the indicator is relatively more visible and an deactivated state where the indicator is relatively less visible;
      a plurality of sensors each associated with a corresponding one of the holes; the sensors operative to detect the presence of the stylus in the corresponding hole;
      a controller circuit communicating with the lights and the sensors;
   wherein the controller circuit is operative to cause not more than one of the plurality visual indicators to be activated at any given time during an active game session to indicate a target hole; wherein the controller circuit is operative to cause a different indictor to be activated in response to detection, by the associated sensor, of the presence of the stylus in the target hole;
   wherein the controller circuit is configured to terminate an active game session after initiation thereof in response to detection, by the associated sensor, of the insertion of the stylus into any of the holes of the plurality of holes when the associated indicator is deactivated.

2. The game of claim 1 wherein the first and second holes are arranged in a non-linear array.

3. The game of claim 1 wherein the first and second holes are intermixed.

4. The game of claim 1 wherein the controller has a plurality of game modes; wherein in a first game mode, the controller is operative to cause the visual indicators to be activated in a predetermined adjacent sequence.

5. The game of claim 4 wherein in a second game mode, the controller is operative to cause the indicators to be activated in a random sequence.

6. The game of claim 5 wherein the electronics further comprise a vibration sensor for sensing vibration of the housing; wherein, in a third game mode, the controller is operative to:
   cause the indicators to be activated in a random sequence;
   terminate the active game session upon the earlier of:
      detection, by the associated sensor, of the insertion of the stylus into any of the holes of the plurality of holes when the associated indicator is in the deactivated state;
      detection, by the vibration sensor, of vibration of the housing.

7. The game of claim 6 wherein the electronics further comprise a displacement mechanism operative to selectively move the housing; wherein the controller circuit is operative, in a fourth game mode, to activate the displacement mechanism to cause the housing to intermittently move in an unpredictable fashion.

8. The game of claim 1 further comprising a display operative to display a time associated with insertion of the stylus into all the holes of the plurality of holes.

9. The game of claim 1 wherein the electronics further comprise a timer circuit in communication with the controller; wherein the controller circuit is configured to terminate the active game session in response to the earlier occurring of:
   expiration of the timer; and
   detection, by the associated sensor, of the insertion of the stylus into any of the holes of the plurality of holes when the associated indicator is deactivated.

10. A game, comprising:
   a housing having electronics associated therewith;
   a stylus having first and second ends; the first and second ends having different cross-sectional shapes;
   the housing having a first plurality of holes of a first shape and a second plurality of holes of a second shape; the first shape corresponding to the shape of the stylus first end; the second shape corresponding to the shape of the stylus second end;
   the electronics comprising:
      a plurality of variable visual indicators each associated with a corresponding one of the holes; each of the visual indicators having an activated state where the indicator is relatively more visible and an deactivated state where the indicator is relatively less visible;
      a plurality of sensors each associated with a corresponding one of the holes; the sensors operative to detect the presence of the stylus in the corresponding hole;
      a displacement mechanism operative to move the housing;
      a controller circuit communicating with the lights, the sensors, and the displacement mechanism;
   wherein the controller circuit causes not more than one of the plurality visual indicators to be activated at any given time during an active game session to indicate a target hole; wherein the controller circuit is operative to cause a different indictor to be activated in response to detection, by the associated sensor, of the presence of the stylus in the target hole;

wherein the controller circuit is configured to terminate an active game session after initiation thereof in response to detection, by the associated sensor, of the insertion of the stylus into any of the holes of the plurality of holes when the associated indicator is deactivated;

wherein the controller circuit is operative to activate the displacement mechanism to cause the housing to intermittently move in an unpredictable fashion.

11. The game of claim 10 wherein the electronics further comprise a timer circuit in communication with the controller; wherein the controller circuit is configured to terminate the active game session in response to the earlier occurring of:

expiration of the timer; and detection, by the associated sensor, of the insertion of the stylus into any of the holes of the plurality of holes when the associated indicator is deactivated.

* * * * *